(12) United States Patent
Choi et al.

(10) Patent No.: US 7,616,679 B2
(45) Date of Patent: Nov. 10, 2009

(54) METHOD AND APPARATUS FOR SEARCHING CELLS UTILIZING DOWN LINK PREAMBLE SIGNAL

(75) Inventors: Joonsang Choi, Seoul (KR); Jungnam Yun, Seoul (KR); Jaehyeong Kim, Seoul (KR)

(73) Assignee: Posdata Co., Ltd., Seongnam-si (KR)

( * ) Notice: Subject to any disclaimer, the term of this patent is extended or adjusted under 35 U.S.C. 154(b) by 562 days.

(21) Appl. No.: 11/394,044

(22) Filed: Mar. 29, 2006

(65) Prior Publication Data

US 2007/0230590 A1    Oct. 4, 2007

(51) Int. Cl.
*H04B 1/69* (2006.01)
(52) U.S. Cl. ........................ 375/147; 375/130
(58) Field of Classification Search ............... 375/260, 375/343, 146, 140, 130; 455/435, 435.3; 370/441, 445, 335, 328
See application file for complete search history.

(56) References Cited

U.S. PATENT DOCUMENTS 7,315,566 B2 * 1/2008 Tanno et al. ............... 375/142

2005/0157637 A1   7/2005 Feng et al.
2005/0185743 A1 * 8/2005 Li ............................. 375/350
2006/0062196 A1 * 3/2006 Cai et al. .................... 370/345

FOREIGN PATENT DOCUMENTS

| EP | 1592192 A2 | 11/2005 |
|---|---|---|
| KR | 10-2005-0003800 A | 1/2005 |
| KR | 10-2006-0010309 A | 2/2006 |
| WO | WO 2004/049618 A1 | 6/2004 |

* cited by examiner

*Primary Examiner*—Khai Tran
(74) *Attorney, Agent, or Firm*—Fenwick & West LLP

(57) ABSTRACT

An apparatus for searching for a cell in a mobile communication system, including: a preamble sequence storage unit storing preamble sequences each of which corresponds to one preamble index, and a cell searching unit correlating a received signal and the stored preamble sequences in a time domain and identifying the preamble index corresponding to the received signal. The cell searching apparatus correlates a received signal and stored preamble sequences in a time domain. The apparatus employs binary quantization of preamble sequences to reduce calculation and memory size. Also, the stored preamble sequences are phase pre-rotated according to a segment number, to prevent from a burden of frequency offset correction caused by three different hypotheses. Accordingly, a complexity of the cell searching apparatus is reduced and cell searching performance becomes more accurate.

18 Claims, 9 Drawing Sheets

METHOD AND APPARATUS FOR SEARCHING CELLS UTILIZING DOWN LINK PREAMBLE SIGNAL

BACKGROUND OF THE INVENTION

1. Field of the Invention

The present invention relates to an apparatus and method for searching for a cell of a mobile communication system, and more particularly, to an apparatus and method for searching for a cell by identifying a preamble index corresponding to a signal received from a radio access station (RAS) in a mobile communication system supporting orthogonal frequency division multiple access (OFDMA) mode.

2. Description of Related Art

A "cell searching apparatus" and a "cell searching method" as used in the present specification may mean all apparatuses and methods which can search for a cell or a sector. In this instance, the cell or the sector is interpreted as a regional area corresponding to each RAS of a mobile communication system. The "cell searching apparatus" may either operate as a stand-alone device or as an embedded part of a mobile communication system including portable devices and/or measuring equipment, etc.

As known to those skilled in the related art, data are transmitted by a frame unit in an OFDMA mobile communication system. FIG. 1 illustrates an example of an OFDMA time division duplex (TDD) frame structure complying with a Mobile Broadband (WiBro) standard. The frame structure illustrated in FIG. 1 follows an Institute of Electrical and Electronics Engineers (IEEE) 802.16d/e standard. FIG. 1 illustrates a downlink (DL) frame from a connection between a mobile base station, i.e., an RAS, and a portable device, i.e., a portable subscriber station (PSS). Also, the DL frame includes a preamble, a DL subframe and an uplink (UL) subframe. Hereinafter, a "preamble" as used in the present specification means a DL preamble included in a DL frame.

Referring to FIG. 1, a preamble is allocated to a first symbol of a DL frame. The allocated preamble is utilized for frame synchronization and cell partition. In association with the technical field where the present invention is applied, the preamble represents cell identification number (ID) and segment number information which can identify a cell of a mobile communication system. Accordingly, the portable device may identify the cell by using the preamble and may set up a connection with an RAS corresponding to the identified cell.

FIG. 2 is a diagram illustrating a segment-wise preamble transmission structure of an OFDM/OFDMA mobile communication system. As illustrated in the figure, each guard band is provided on a left side and a right side of a plurality of subcarriers to reduce an interference of a neighboring frequency band, and a direct current (DC) subcarrier, which is a null subcarrier, is provided. Also, as illustrated in the figure, preamble subcarriers for each segment are arranged at a predetermined interval, for example, three subcarrier intervals, in FIG. 2. An RAS corresponding to each cell may transmit a preamble signal containing preamble information corresponding to a given cell ID by using a segment allocated to the RAS. Accordingly, a portable device may identify the preamble index corresponding to a signal received from the RAS. A preamble signal is used as an example of the received signal in the present specification. Also, the portable device may identify a cell ID of the RAS and a segment number given to the RAS from the received signal.

In the present specification, the description is limited to only when a total number of segments is three. However, it will be apparent to those skilled in the related art that an application range of the cell searching apparatus and method described in the present specification is not limited thereto, but applicable according to a type of a mobile communication system and a standard thereof.

A cell searching apparatus is an apparatus necessary for setting up a connection between a portable device and an RAS, and stably transmitting/receiving data therebetween. At every instance of a physical movement of the portable device or a change of wireless channel state, the portable device has to re establish a connection with the RAS. For this, a cell containing the portable device needs to be searched for. In particular, when a handover occurs frequently according to a movement of the portable device between cells or sectors, a cell searching performance of the portable device becomes a very important factor to determine the quality of mobile data communication.

As illustrated in FIG. 2, a preamble received in a portable device may include a plurality of preamble signals which are transmitted from a plurality of RASs. Accordingly, the portable device may determine the strongest preamble signal from among the received preamble signals and set up a connection with an RAS which can transmit/receive data in the strongest signal level, among a plurality of neighboring cells as well as the cell containing the portable device.

A conventional cell searching apparatus performs a correlation in a frequency domain. As is known, an RAS of an OFDMA system converts a frequency domain preamble signal containing data represented by a plurality of subcarriers to a time domain signal via an Inverse Fast Fourier Transform (IFFT) module and transmits the converted signal. Accordingly, the conventional cell searching apparatus initially converts a received preamble signal to a frequency domain and subsequently correlates the converted preamble signal with preamble sequences stored in a portable device, in a frequency domain.

FIG. 3 is a diagram illustrating an example of the conventional cell searching apparatus which performs a correlation in a frequency domain, as described above. A cell searching method using the cell searching apparatus illustrated in the figure is as follows. Initially, a correlation value between y(k) and $P_d(k)$ is calculated, in which y(k) is a received signal in a frequency domain via a Fast Fourier Transform (FFT) module 310 and $P_d(k)$ is a preamble sequence stored in a cell searching apparatus. A correlation module for obtaining the correlation value may include a delay module 320, a complex conjugate module 330, a multiplier and a summator 340. Each correlation value is calculated with respect to D pre-stored preamble sequences, and a preamble sequence having a maximum correlation value may be obtained therefrom. When a preamble index which is an index value corresponding to the obtained preamble sequence is $d_{identified}$, the process is represented as Equation 1 below, $$d_{identified} = \underset{d}{\operatorname{argmax}} \left\{ \sum_{k=0}^{K-1} y(k) P_d^*(k) \right\} \qquad \text{[Equation 1]}$$

In this instance, K indicates a number of subcarriers constructing a single preamble sequence, and d an index of each candidate preamble sequence. As an example, K may have a value of '284' which is obtained by dividing '852' subcarriers by three, a total number of segments. In this instance, '852' subcarriers are obtained by subtracting '172' guard band subcarriers from '1024' total subcarriers, The conventional cell searching apparatus as described above requires detecting accurate frame boundary timing and a subcarrier frequency offset for a normal operation. An error which occurs during an initial frame boundary timing detection process makes FFT timing information inaccurate. A phase offset is generated due to the inaccurate FFT timing information. The generated phase offset deteriorates a general searching performance. In particular, when a portable device is positioned in a cell boundary, the conventional cell searching apparatus may not produce an accurate search result.

Also, when reflecting the influence of a subcarrier frequency offset, the conventional cell searching apparatus may not identify a segment number from a preamble signal. Accordingly, the load on the portable device increases in proportion to a total number of segments, for it requires additional hypothesis test for each case of segment number. For the initial carrier frequency offset estimation case, the segment number's uncertainty problem before cell searching process requires three times more hypothesis tests (with three segment number) per each preamble's correlation operation. This kind of operation mandates heavy computation load and implementation complexities which need to be avoided for low power and low cost implementation option at the PSS side.

Accordingly, a new technology which can quickly and accurately search for a cell from a received preamble signal in a mobile communication system by using less resource as compared to the conventional art.

SUMMARY OF THE INVENTION

The present invention provides a cell searching apparatus and method which can improve a searching speed and accuracy by reducing a complexity of hardware and software and in a cell searching apparatus of a portable device.

The present invention also provides a cell searching apparatus and a method which can reduce a frame boundary detection error and a subcarrier frequency offset error affecting a cell searching performance, by performing a correlation with respect to a received preamble signal and stored preamble sequences in a time domain.

The present invention also provides cell searching apparatus and method which can reduce a complexity of a correlation calculation by using pre-rotated preamble sequences in a time domain and provides a more effective configuration.

The present invention also provides cell searching apparatus and method which can reduce a calculation complexity of the cell searching apparatus and reduce a memory required to store preamble sequences by using binary quantized preamble sequences, and thus, be more suitable for a mobile communication system.

The present invention also provides cell searching apparatus and method which can iteratively perform a correlation in a correlation window size, and simultaneously extract a preamble index corresponding to the received signal and a timing index for a fine detection of a frame boundary.

The present invention also provides cell searching apparatus and method which can improve a cell searching performance of a portable device and establish a quick and stable link with an RAS, through a configuration including an initial frame boundary detector, an initial frequency offset estimator, and the cell searching apparatus.

The present invention also provides cell searching apparatus and method which can repeat cell searching with respect to a plurality of consecutively received frames, when a predetermined criterion is not satisfied, to achieve a stable cell searching performance.

The present invention also provides cell searching apparatus and method which can decrease a production cost and power consumption and improve a production yield by reducing a hardware and software complexity of a portable device.

According to an aspect of the present invention, there is provided a cell searching apparatus including: a preamble sequence storage unit storing preamble sequences each of which corresponds to one preamble index, and a cell searching unit correlating the received signal with the stored preamble sequences in a time domain and identifying the preamble index corresponding to the received signal.

According to another aspect of the present invention, there is provided a portable device including: an initial frame boundary detector detecting a frame boundary of a received signal, an initial frequency offset estimator estimating a frequency offset of a frame identified by the detected frame boundary, and a cell searching apparatus searching for a cell by using the estimated frequency offset of the frame identified by the detected frame boundary, wherein the cell searching apparatus comprises: a preamble sequence storage unit storing a plurality of preamble sequences each of which corresponds to one preamble index, and a cell searching unit correlating the received signal with the stored preamble sequences in a time domain and identifying the preamble index corresponding to the received signal.

According to still another aspect of the present invention, there is provided a method of searching for a cell in a mobile communication system, the method including the steps of: receiving a signal transmitted from a radio access station, and identifying a preamble index corresponding to the received signal by correlating the received signal with a plurality of preamble sequences, each of which corresponds to one preamble index in a time domain.

Also, a "mobile communication system" as used in the present specification may be a system based on any one of an IEEE 802.16d/e standard, WiBro, and WiMAX.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
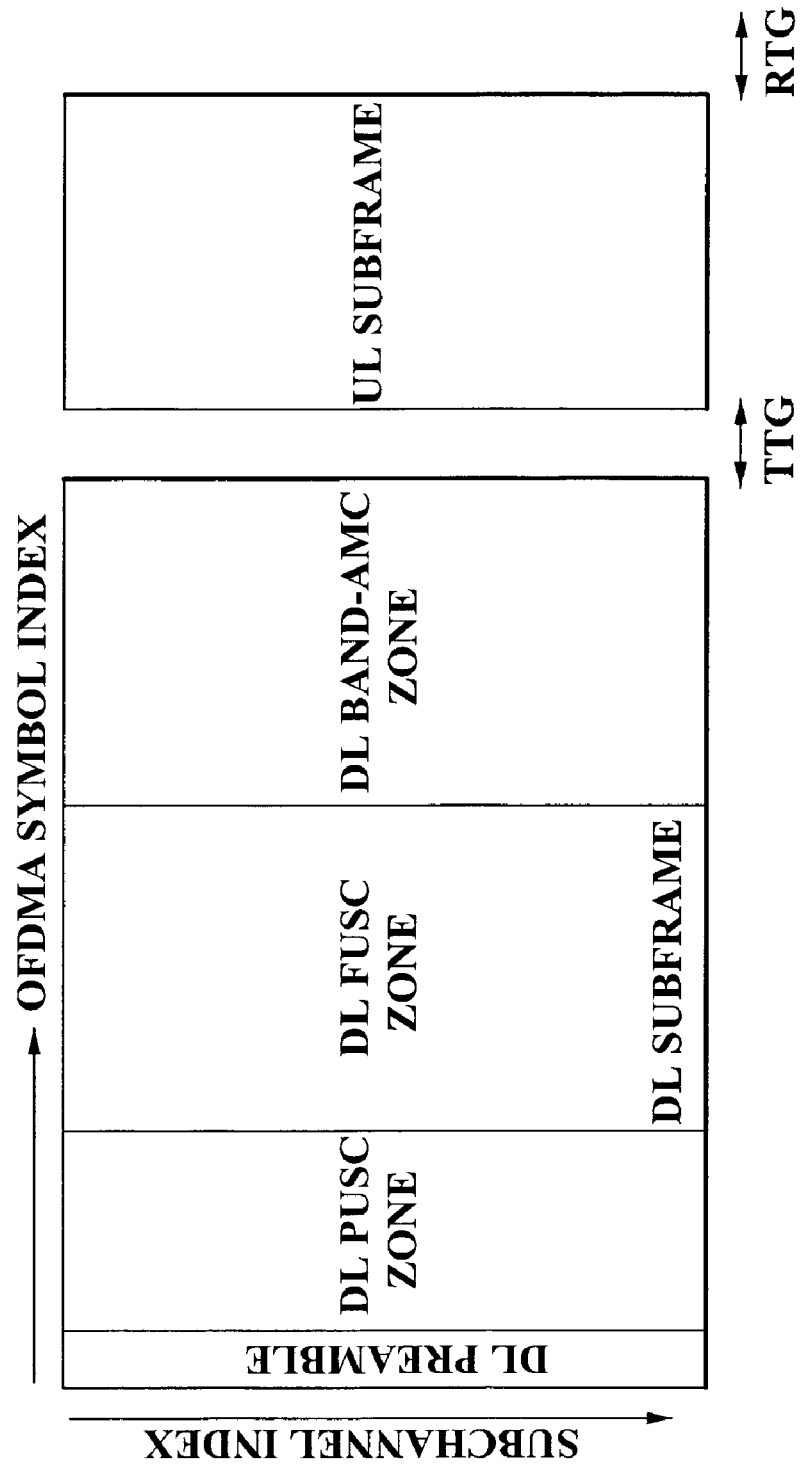
FIG. 1 is a diagram illustrating an example of an OFDMA TDD frame structure of an IEEE 802.16d/e standard.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 4:
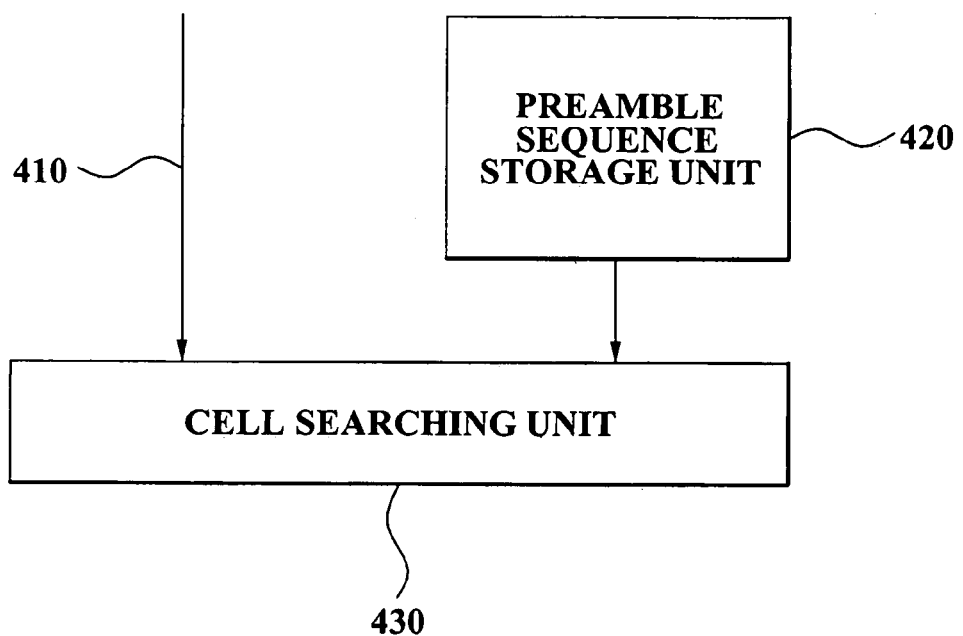
FIG. 4 is a block diagram illustrating a cell searching apparatus according to an embodiment of the present invention.

FIG. 4 is a block diagram illustrating an internal configuration of a cell searching apparatus according to an embodiment of the present invention.

As illustrated in FIG. 4, the cell searching apparatus includes a preamble sequence storage unit 420 storing preamble sequences each of which corresponds to each preamble index, and a cell searching unit 430 correlating a received signal 410 and the stored preamble sequences in a time domain and identifying a preamble index corresponding to the received signal.

As illustrated in the figure, the preamble sequence storage unit 420 stores a plurality of preamble sequences to be correlated with the received signal. A preamble signal is used in the following description as an example of the received signal. The cell searching apparatus according to an embodiment of the present invention may store pre-rotated sequences, binary quantized sequences, or complex conjugated sequences as the preamble sequences.

Referring to FIG. 4, the cell searching unit 430 correlates the preamble signal with the preamble sequences in a time domain. The cell searching unit 430 according to an embodiment of the present invention may repeat correlating the preamble signal with the preamble sequences over a predetermined size of correlation window. According to another embodiment of the present invention, the cell searching unit 430 may simultaneously extract a timing index for a fine detection of a frame boundary through the correlation over the correlation window.

Figure 5:
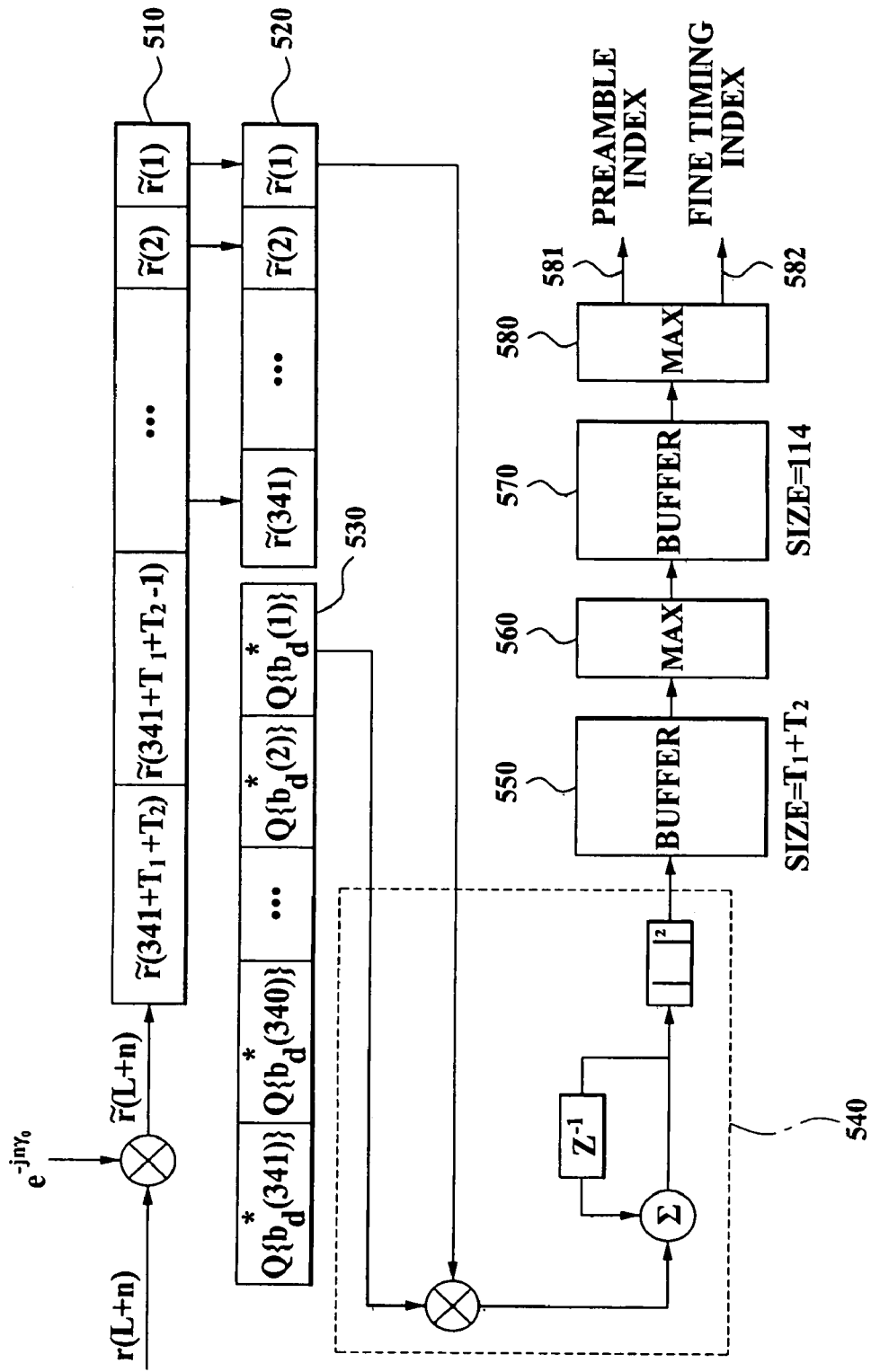
FIG. 5 is a block diagram illustrating a configuration and operation of a cell searching apparatus according to an embodiment of the present invention.

FIG. 5 is a block diagram illustrating a configuration and an operation of a cell searching apparatus according to an embodiment of the present invention. Hereinafter, a configuration and operation of the cell searching apparatus according to an embodiment of the present invention will be described in detail with reference to FIG. 5.

Referring to FIG. 5, the cell searching apparatus receives a preamble signal r(L+n). The cell searching apparatus also receives frame boundary information and subcarrier frequency offset information, which are utilized for searching for a cell. $\tilde{r}(L+n)$, the received signal which is rotated in a time domain by the amount of the frequency offset value, is obtained. In this instance, $\tilde{r}(L+n)$ is obtained by multiplying the preamble signal r(L+n) by $e^{-jn\gamma_0}$. L is a starting index of the frame boundary. Though this, a phase-shifting effect caused by the frequency offset is compensated for. The phase pre-compensated received signal is to be correlated with a set, of pre-stored preamble sequences which are pre-rotated in a time domain. Description related thereto will be described in detail below.

As illustrated in FIG. 5, the phase pre-compensated received signal $\tilde{r}(L+n)$ is sampled and stored in a buffer 510 for a correlation operation. Since the cell searching apparatus according to an embodiment of the present invention performs correlation in a time domain, not in a frequency domain, the cell searching apparatus does not include an FFT module. Accordingly, a time domain signal itself is sampled and stored, instead of a Fourier transformed frequency domain signal.

The correlation is repeated over a predetermined correlation window size. The correlation window size may be determined by '96' samples corresponding to three quarters of the size of a cyclic prefix (CP). However, the present invention is not limited thereto and it will be apparent to those skilled in the related art that the present invention may utilize a different the correlation window size corresponding to a different ratio for the size of the CP.

For this, the cell searching apparatus samples the signal, $\tilde{r}(L+n)$, as many times as a value, for example, $341+T_2-T_1+1$, which is obtained by applying the correlation window size, for example, $T_2-T_1+1$, to a number of samples used for correlation, for example, '341' samples. In this instance, $T_1$ and $T_2$ are parameters to determine the size of the correlation window, respectively indicating a window starting index and a window ending index.

Figure 2:
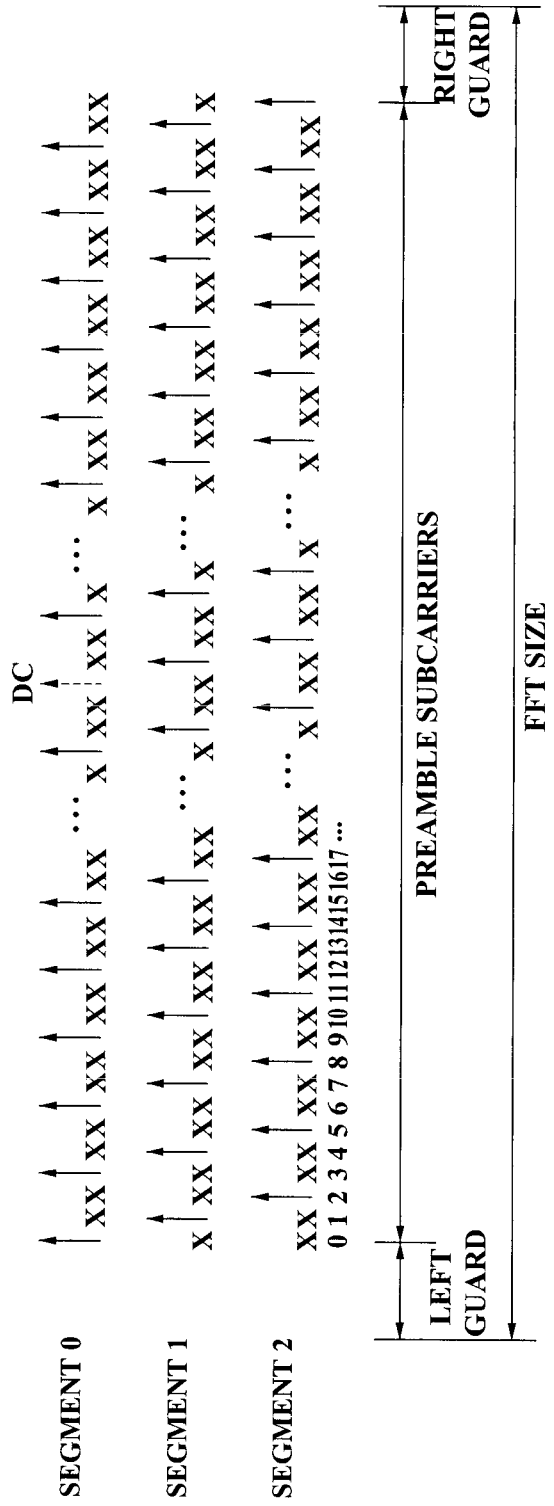
FIG. 2 is a diagram illustrating each segment of a downlink preamble utilized by a cell searching apparatus and method in an OFDMA mobile communication system.
Figure 3:
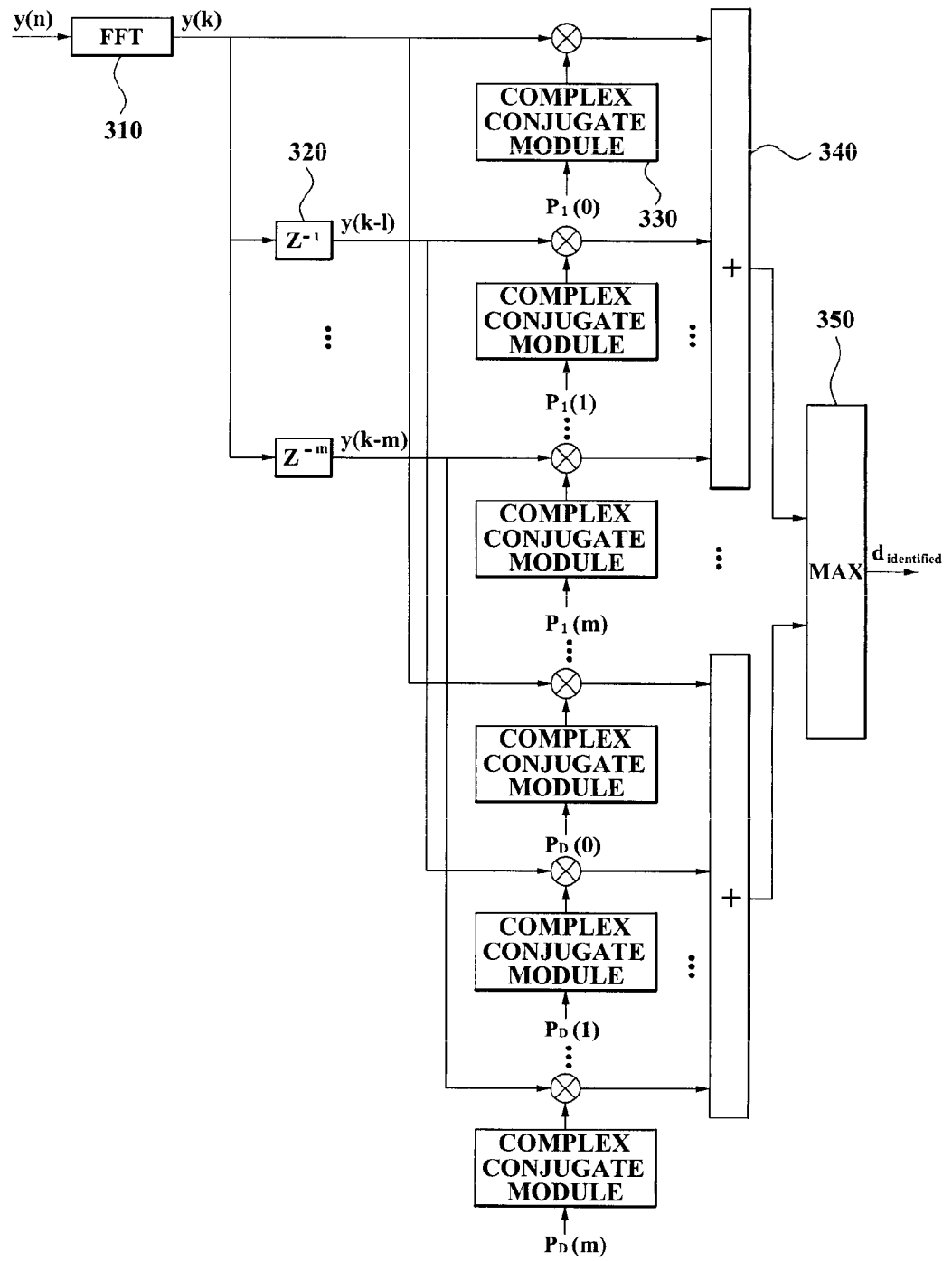
FIG. 3 is a block diagram illustrating a configuration of the conventional cell searching apparatus performing a correlation in a frequency domain.

Only '341' samples 520 from the sampled preamble signal 510 are utilized for correlation with the stored preamble sequences 530. The number of samples utilized for the correlation, '341', is determined on the following basis. The preamble signal has a property of repeating a certain pattern by a number of segments in a time domain. As an example, the preamble has time domain's repetition property according to a number of preamble segments as illustrated in FIG. 2. The preamble signal in a time domain according to an embodiment of the present invention may be constructed of '1024' samples, which is an FFT number. The preamble as illustrated in FIG. 2 is a time domain signal and is received in the form of a signal repeated by the preamble segment number.

Due to the repetition property of the preamble signal in a time domain, only '341' samples are used for a correlation calculation, not the total number of '1024' samples. As described above, a portion of the total samples, more particularly, the number of preamble signal samples determined by the preamble repetition pattern length is utilized for correlation in a time domain. Accordingly, a complexity of a cell searching apparatus according to an embodiment of the present invention may be reduced. Also, a cell may be searched for more quickly. A number of preamble signal samples utilized for the correlation calculation may have a different value other than '341', according to a number of preamble segments and an FFT number used in a mobile communication system.

As illustrated in FIG. 5, '341' samples of the preamble signal pre-rotated in a time domain, $\tilde{r}(L+n)$, is inputted to a correlation unit 540 for a correlation with the '341' samples of each preamble sequence 530, $b_d(n)$. The correlation unit 540 may include a multiplier, a delay module, a summator and an absolute calculator. When a complex conjugate value of the preamble sequence $b_d(n)$ is stored, a complex conjugate module may not be utilized in the cell searching apparatus according to an embodiment of the present invention. Accordingly, calculation time or hardware resources of the cell searching apparatus may be decreased.

As described above, a correlation value between a preamble signal and preamble sequences may be obtained. While shifting a starting position of correlation samples which are formed of '341' samples among samples of the stored $\tilde{r}(L+n)$, correlation is performed with respect to one preamble sequence, as many as $T_2-T_1+1$ times, and each correlation value is stored in a first correlation value buffer 550. Each correlation value is stored by repeating correlation over a certain size of a correlation window. A correlation value having a maximum peak may be identified from $T_2-T_1+1$ number of correlation values by using a first maximum value discriminator 560.

The process of identifying a correlation value having a maximum peak is repeated with respect to a plurality of pre-stored preamble sequences. Each correlation value having a maximum peak is stored in a second correlation value buffer 570. A maximum peak is identified from the correlation values stored in the second correlation value buffer 570 by using a second maximum value discriminator 580. The cell searching apparatus according to an embodiment of the present invention stores the total number of preamble sequences, '114', according to a WiBro standard and repeats the process of identifying a preamble sequence having a maximum peak with respect to '114' preamble sequences. However, the present invention is not limited thereto, and may utilize a number of preamble sequences other than '114' according to a kind of mobile communication system and a standard thereof.

According to another embodiment of the present invention, the first correlation value buffer 550 and the first maximum value discriminator 560 may be configured as follows. Namely, instead of storing each correlation value calculated from $T_1$ to $T_2$ in the first correlation value buffer 550 and inputting the correlation values in the first maximum value discriminator 560, the first correlation value buffer 550 and the first maximum value discriminator 560 may be configured to compare a currently obtained correlation value with a previously obtained maximum correlation value and update a current maximum value by comparing the two. In this instance, a maximum correlation value may be stored as well as a preamble index corresponding thereto. When an operation of determining a maximum correlation value is configured as above, a cell searching apparatus efficiently utilizing hardware resources may be provided for a general portable device having a limited memory resource. The above-described configuration may be applied to the second correlation value buffer 570 and the second maximum value discriminator 580.

A preamble index 581 corresponding to a correlation value having a maximum peak may be obtained by using the cell searching apparatus according to an embodiment of the present invention, as illustrated in FIG. 5. Also, a cell ID and a segment number of an RAS, which has transmitted the preamble signal, may be identified from the preamble index 581. Also, the cell searching apparatus according to an embodiment of the present invention may obtain a fine timing index 582 as illustrated in FIG. 5. Namely, a timing index having a maximum peak may be taken from among the correlation values obtained by repeatedly correlating over the correlation window, to determine a fine frame boundary timing. While initial frame boundary detection is needed for cell searching, a fine timing may be obtained as another result of the cell searching. The cell searching apparatus according to the above-described embodiment may obtain a fine frame boundary timing, thus reduce a symbol error.

In a cell searching apparatus according to another embodiment of the present invention, the pre-stored preamble sequences are phase pre-rotated sequences. As illustrated in FIG. 2, a set of subcarriers, including cell ID information of an RAS, may be arranged according to each segment number. Namely, the subcarriers of each segment are arranged in a predetermined interval and are shifted from each other in a frequency domain. Due to the property of Fourier transform, the received signal is phase-rotated in a time domain. Accordingly, the cell searching apparatus stores preamble sequences phase rotated by different amounts with respect to each segment index, in order to find a segment number of the RAS which transmits the strongest preamble signal. The phase rotated preamble sequence $b_d(n)$ according to the present embodiment may be represented according to each segment number, as Equation 2 below, $$b_d(n)=u_d^*(n), \text{segment}=0$$

$$b_d(n)=e^{j2\pi n/1024} \cdot u_d^*(n), \text{segment}=1$$

$$b_d(n)=e^{-j2\pi n/1024} \cdot u_d^*(n), \text{segment}=2 \quad \text{[Equation 2]}$$

In Equation 2, $u_d^*(n)$ is a complex conjugate of a time domain preamble sequence where a preamble index is d. The preamble sequence $b_d(n)$ may be stored in a read only memory (ROM) as a look up table (LUT).

In a cell searching apparatus according to still another embodiment of the present invention, the pre-stored preamble sequence is a binary quantized sequence. As is known, a sampled preamble signal is a time domain signal translated through IFFT. Accordingly, the sampled preamble signal may be generally represented as a plurality of bits, for example, 8 bits. A general method of performing a correlation with the phase pre-compensated received preamble signal is to use a preamble sequence which is represented as the same number of bits. However, in the cell searching apparatus according to the present embodiment, the pre-stored preamble sequence for a correlation calculation is binary quantized. Accordingly, each sample may be represented as a 1 bit value. As an example, when a level of a sampled signal is over 0, the sample maybe represented as '1'. Also, when a level of a sampled signal is below 0, the sample may be represented as '−1'.

Accurate cell searching requires a comparative size of a correlation value, a preamble index having a maximum peak and timing information at the point of the maximum peak, not an absolute numerical value of the maximum peak. Accordingly, although the pre-stored preamble sequence $b_d(n)$ may be represented as 1 bit, the cell searching performance according to the binary quantization has been proved not to be greatly affected by simulations.

Accordingly, the cell searching apparatus according to the present embodiment may reduce required hardware resources of a correlation calculation unit and memory for storing preamble sequences. Accordingly, the cell searching apparatus may decrease the total power consumption of a portable device.

A configuration including the above-described embodiments is illustrated in FIG. 5. A preamble index extraction process of the cell searching apparatus constructed as illustrated in FIG. 5 is represented as Equation 3 below, $$d_{identified} = \underset{d}{\operatorname{argmax}}\left\{\underset{i=T_1}{\overset{T_2}{\max}}\left[\left|\sum_{n=0}^{340} r(L+i+n) \cdot e^{-jn\gamma_0} \cdot Q\{b_d(n)\}\right|^2\right]\right\} \quad \text{[Equation 3]}$$

$b_d(n)$ of Equation 3 is the preamble sequence represented as Equation 2. $Q\{\}$ is a binary quantization function. Accordingly, $Q\{b_d(n)\}$ is a binary conjugate preamble sequence which is pre-rotated in a time domain. $\gamma_0$ is a frequency offset value which is detected by an initial frequency offset detector with respect to segment number '0'. $r(L+i+n)$ is a received preamble signal and $d_{identified}$ is a detected preamble index. L in the equation above is a frame boundary index.

As shown in Equation 3, a cell searching apparatus according to an embodiment of the present invention rotates a received preamble signal by the amount of a frequency offset to generate a phase pre-compensated preamble signal, and obtains a correlation value by multiplying each sample of the phase pre-compensated preamble signal and each sample of the pre-rotated binary conjugate preamble sequences in a time domain and summing up the multiplied values. The process is repeated over a correlation window size which is determined by $T_1$ and $T_2$. Through this process, a correlation value having a maximum peak is obtained from among a plurality of the correlation values calculated as described above.

Figure 6:
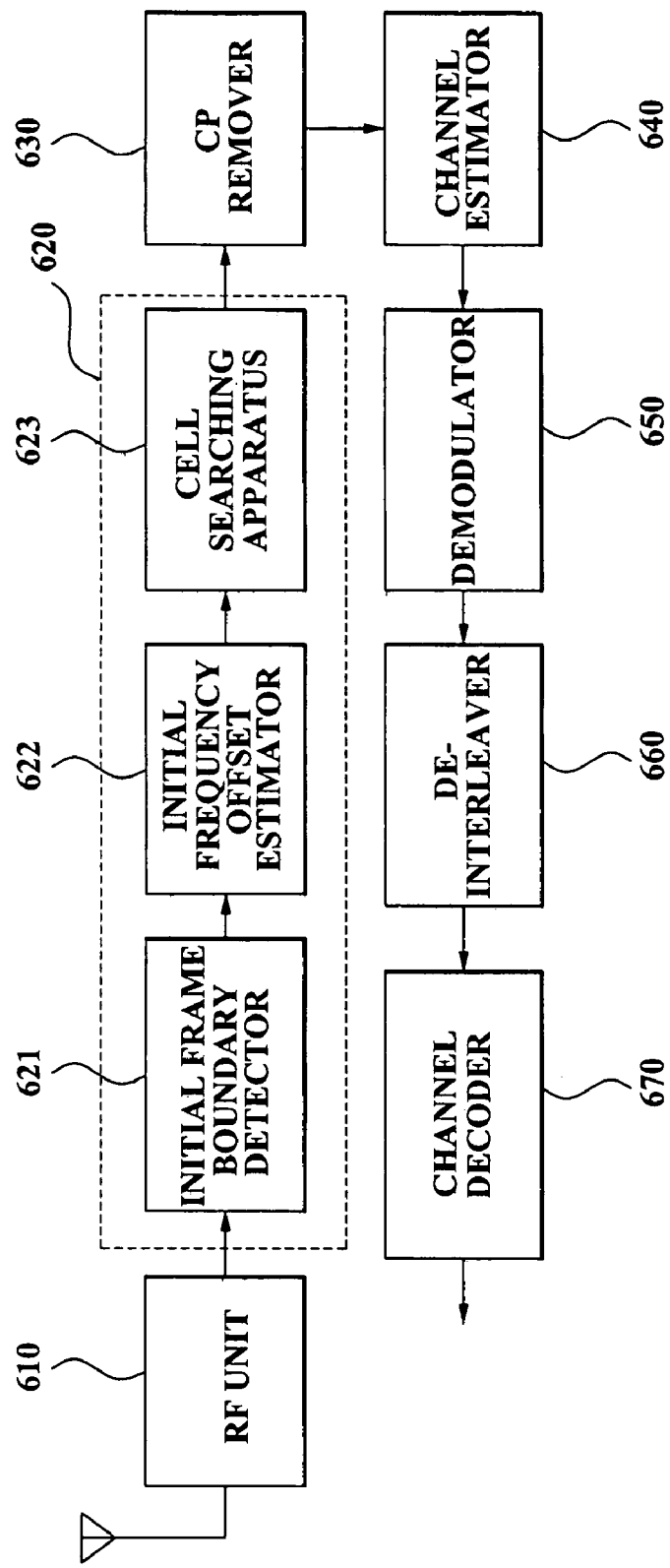
FIG. 6 is a block diagram illustrating a portable device including a cell searching apparatus according to an embodiment of the present invention.

FIG. 6 is a block diagram illustrating an internal configuration of a portable device containing a cell searching apparatus according to an embodiment of the present invention. A baseband signal obtained by a radio frequency (RF) unit 610 is inputted into an initial synchronization module 620. The initial synchronization module 620 includes an initial frame boundary detector 621, an initial frequency offset estimator 622 and a cell searching apparatus 623. The initial frame boundary detector 621 is needed to detect an approximate location of a preamble. The cell searching apparatus 623 operates on the basis of the detected location of the preamble. Also, according to a frame boundary detected by the initial frame boundary detector 621, the initial frequency offset estimator 622 detects a frequency offset of a corresponding frame. The cell searching apparatus 623 may find a cell for the portable device, on the basis of the frame boundary information and the frequency offset information.

Through the initial synchronization module 620, cell searching, symbol timing detection and subcarrier frequency offset estimation is completed, and normal data are prepared to be received. The cell searching apparatus 623 may have the configuration illustrated in FIG. 5. The portable device removes a CP, which is an overhead, using a CP remover 630 and obtains a channel estimation value from a channel estimator 640. The received signal is demodulated in a demodulator 650 according to the channel estimation value and de-interleaved by a de-interleaver 660. Received data may be obtained by a channel decoding process which is performed in a channel decoder 670.

A "portable device" as used in the present specification includes communication devices, such as a Personal Digital Cellular (PDC) phone, a personal communication service (PCS) phone, a personal handyphone system (PHS) phone, a Code Division Multiple Access (CDMA)-2000 (1×, 3×) phone, a Wideband CDMA phone, a dual band/dual mode phone, a Global Standard for Mobile Communications (GSM) phone, a mobile broadband system (MBS) phone, a Digital Multimedia Broadcasting (DMB) terminal, a smart phone, and an orthogonal frequency division multiplexing (OFDM) and OFDMA communication device; portable terminals such as a personal digital assistant (PDA), a hand-held PC, a notebook computer, a laptop computer, a WiBro terminal, an MP3 player, and an MD player; and all types of hand-held based wireless communication devices including an International Mobile Telecommunication (IMT)-2000 providing international roaming service and extended mobile communication service. Also, the "portable device" may include a predetermined communication module such as an OFDMA module, a CDMA module, a Bluetooth module, an Infrared Data Association (IrDA) module, a wired/wireless LAN card and a wireless communication device which is provided with a global positioning system (GPS) chip enabling tracking of a position via a GPS. Also, the "portable device" may include a microprocessor which can play multimedia and perform a certain calculation operation.

Figure 7:
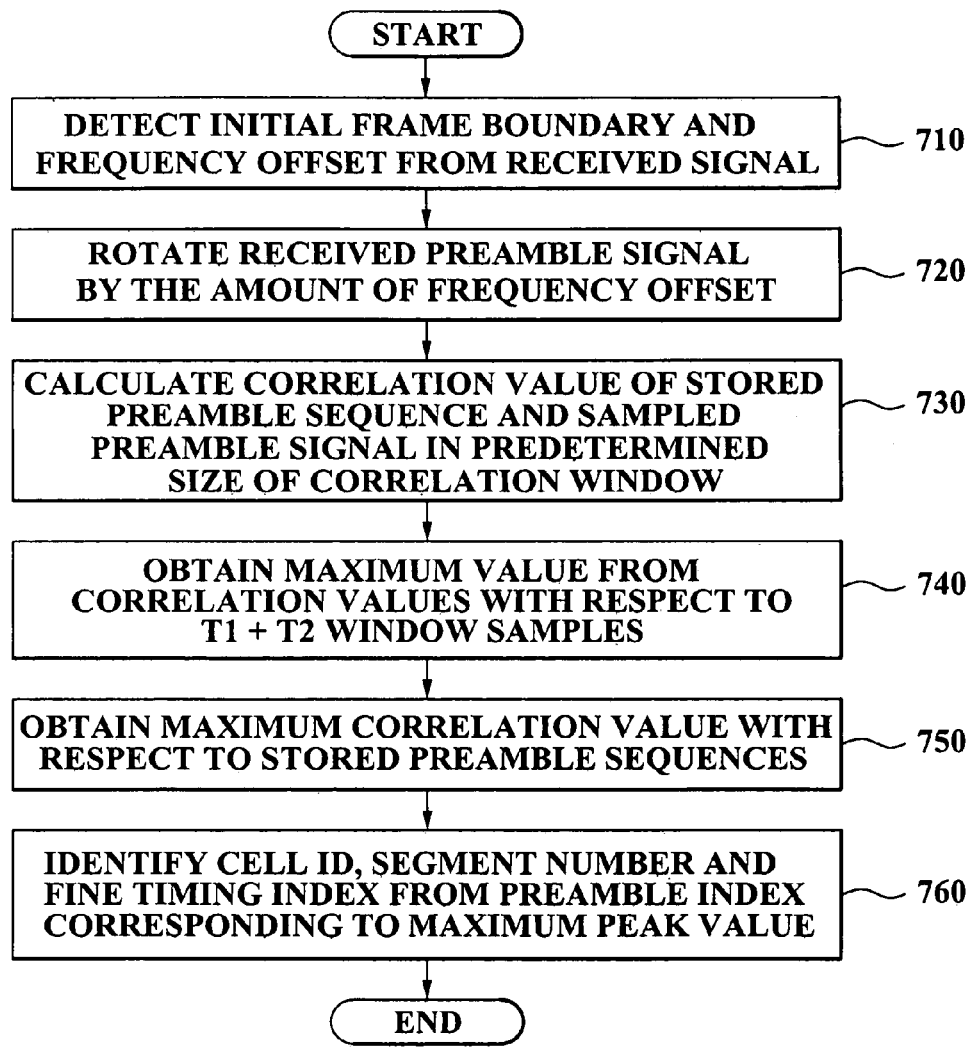
FIG. 7 is a flowchart illustrating a cell searching method according to an embodiment of the present invention.

FIG. 7 is a flowchart illustrating a cell searching method according to an embodiment of the present invention.

Referring to FIG. 7, in operation 710, an initial frame boundary and a frequency offset are detected from a received signal. In this instance, the initial frame boundary indicates an approximate location in which a frame starts in the received signal. Since the present invention relates to the cell searching method using a preamble and the preamble is positioned as a first symbol of a frame, the initial frame boundary is initially detected before cell searching. The frequency offset is also a very important factor which is utilized for cell searching. Accordingly, the frequency offset is detected first, before cell searching.

In operation 720, the received preamble signal is rotated by the amount of a frequency offset, to generate a phase pre-compensated signal. Through this, the phase-shifting effect caused by the frequency offset included in the received preamble signal may be compensated for.

In operation 730, the phase pre-compensated preamble signal is sampled in predetermined length and correlated with one of pre-stored preamble sequences over a certain size of a correlation window. In more details, the preamble sequence means one segment of the preamble sequences.

In operation 740, correlation values with preamble sequences are calculated with respect to the total number, $T_2-T_1+1$, of preamble signal samples over the correlation window, in the same manner as above, and a correlation value having a maximum peak is obtained. In operation 750, a correlation value having a maximum peak with respect to each of the plurality of stored preamble sequences is obtained in the same manner as above.

Referring again to FIG. 7, a cell searching method according to the present embodiment obtains a preamble index having a correlation value corresponding to a maximum peak. In operation 760, a cell ID and a segment number of an RAS may be identified from the preamble index. At first, the phase pre-compensated received signal is presumed to be corresponding to segment number 0. The correlation values are calculated for each of the segment numbers, and a maximum value out of the calculated correlation values and a timing index corresponding thereto produce the exact segment number. Also, timing index information on a position of the maximum peak may be additionally identified. This information represents fine timing index which is used for compensating for an error generated during the initial frame boundary detection procedure.

Also, a cell searching method according to another embodiment of the present invention may further include the operation of repeating cell searching with respect to a plurality of consecutively received frames, when a result of cell searching is not accurate enough. For example, a method for determining whether the result of cell searching is accurate may use a maximum peak correlation value. However, those skilled in the related art may determine whether the result of cell searching is accurate enough using various types of standards.

Figure 8:
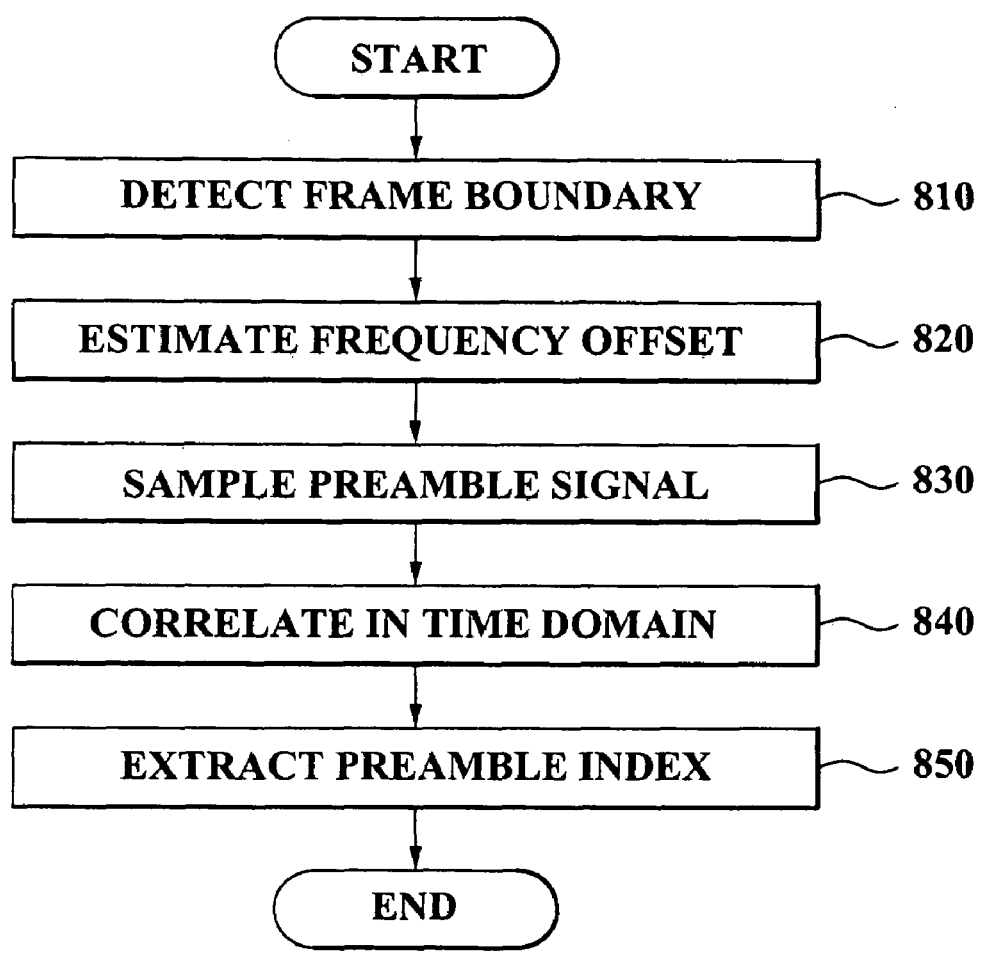
FIG. 8 is a flowchart illustrating a cell searching method according to another embodiment of the present invention.

FIG. 8 is a flowchart illustrating a cell searching method in a mobile communication system according to an embodiment of the present invention.

Referring to FIG. 8, the cell searching method detects a boundary of a frame received from an RAS in operation 810, and estimates a frequency offset of a corresponding frame according to the detected frame boundary, in operation 820. The portable device samples a preamble signal in a predetermined length according to the detected frame boundary in operation 830, and correlates the preamble signal with the preamble sequences stored in the receiver after applying the frequency offset to the preamble signal, in operation 840.

In operation 850, a preamble index corresponding to a maximum peak is identified. Also, the cell searching method according to another embodiment may further include the operation of extracting a fine timing index of a frame boundary, with the operation 850 of identifying the preamble index.

As is known to those skilled in the related art, the flowchart illustrated in FIGS. 7 and 8 are only examples for explaining the above-described embodiments of the present invention and the described operations should not be interpreted as time series operations.

Figure 9:
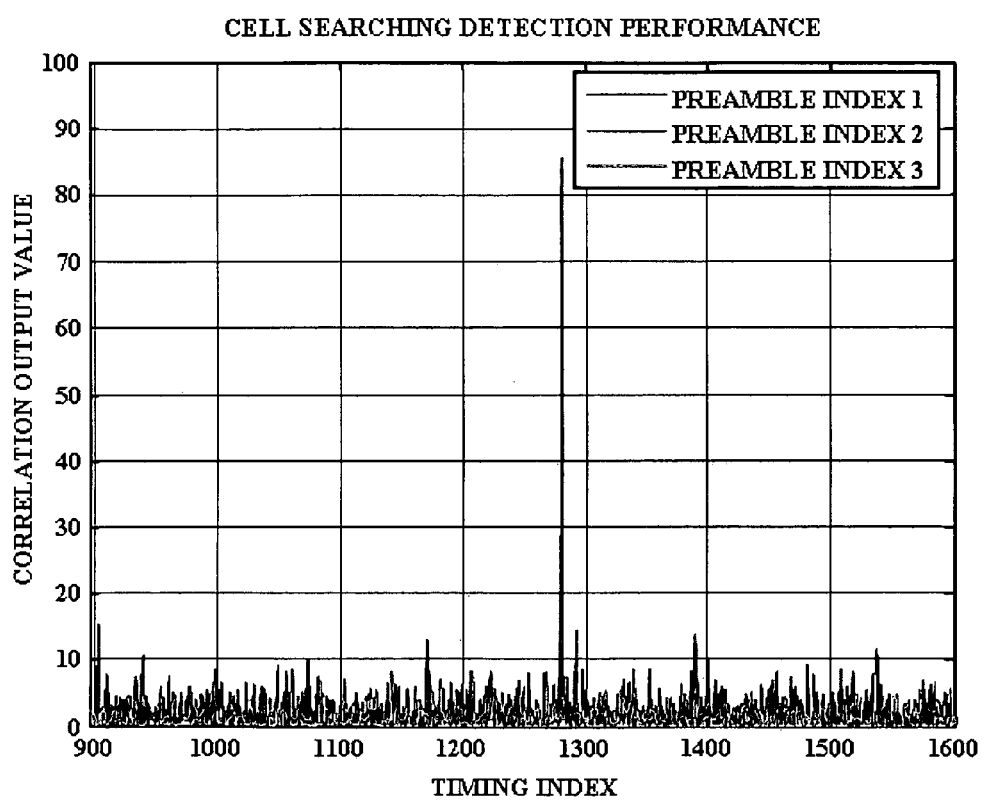
FIG. 9 is a graph illustrating simulation results of the cell searching according to an embodiment of the present invention.

FIG. 9 is a graph illustrating simulation results of the cell searching method which repeatedly performs a time domain correlation with respect to a predetermined length of a preamble signal samples over a correlation window size, according to an embodiment of the present invention. The performance of the cell searching apparatus as illustrated in FIG. 5 is investigated by simulations. In this instance, the preamble sequences are pre-rotated, binary quantized, and stored in the form of a complex conjugate.

The present simulation results are taken from the simulation performed on the basis of a first preamble index, i.e., segment number '0', a second preamble index, i.e., segment number '1', and a third preamble index, i.e., segment number '2', when the total number of segments is three. Also, the simulation assumed a three tap multi-path fading channel. The results when an initial frequency offset value is 1 KHz and Eb/No which is the ratio of signal power and noise power per 1 bit of data is −5 dB are illustrated in FIG. 9.

The horizontal axis of the graph is a fine timing index which is obtained from cell searching and the vertical axis of the graph is a time domain correlation value indicating a cell searching performance. As illustrated in the figure, it can be known that a maximum peak is formed around timing index '1280', as a result of repeatedly correlating over the correlation window in the horizontal axis with respect to the three preamble indices. A correlation value is around 10 or below 10 in a position excluding the maximum peak. A correlation value corresponding to the maximum peak is over 85. In the case of the above level difference, a preamble index having a correlation value corresponding to the maximum peak and a timing index in the maximum peak may be easily found.

As illustrated in the figure, a preamble index and a timing index may be obtained as a result of cell searching. According to the simulation results of the present embodiment illustrated in FIG. 9, the second preamble index is found around the timing index '1280'. A cell ID and a segment number, for example, segment number '1' according to the present embodiment, of an RAS may be identified from the second preamble index. A timing error existing in the initial frame boundary detection may be compensated for by the detected fine timing index '1280'.

As shown in the results of simulation, the cell searching apparatus and method according to the above-described embodiments of the present invention shows satisfactory performance.

The present invention does not need to re-convert a received preamble signal to a frequency domain, to perform a correlation. Accordingly, a calculation time and a complexity of hardware and software of a portable device may be reduced.

Also, the present invention utilizes a portion of the total samples of a received preamble signal, more particularly a certain number of samples determined by a repeated pattern length of the preamble signal for a time domain correlation, by using a periodical repetition property of a preamble signal in a time domain. Accordingly, a cell searching speed may be improved.

Also, a cell searching apparatus and method according to the present invention stores pre-rotated preamble sequences and correlate a received signal with the stored phase pre-rotated preamble sequences. Accordingly, an increase of a calculation time and a hardware and software complexity may be reduced by the number of segments.

Also, the present invention stores binary quantized preamble sequences, and correlates a received preamble signal with the stored binary quantized preamble sequences. Accordingly, a memory space required by the cell searching apparatus is reduced. Also, hardware components performing a correlation calculation may be more efficiently constructed.

Also, the present invention stores complex conjugates of the preamble sequences. Accordingly, an increase in a cell searching time and a complexity of the cell searching apparatus, which may occur by including a complex conjugate module in the conventional art, may be prevented.

Also, the present invention repeatedly correlates a received preamble signal with preamble sequences over a predetermined size of correlation window. Accordingly, accuracy of cell searching may be improved.

Also, the present invention extracts a timing index having a maximum peak from among correlation values which are obtained by repeating correlation over the correlation window, to determine a fine timing index. Accordingly, the effect of an error generated when detecting an initial frame boundary is removed. Also, cell searching may be more accurately performed. As a result of detecting transmitted messages based on an accurate frame boundary, an entire message detecting performance of a receiver may be improved.

Also, the present invention repeats a cell searching process with respect to a plurality of consecutively received frames, when a predetermined criterion is not satisfied. Accordingly, cell searching may be more stably performed.

In summary, the present invention reduces a calculation time and a complexity of hardware and software of the cell searching apparatus, while maintaining an advanced level of cell searching performance. Accordingly, a more efficient and stable cell searching apparatus may be obtained.

Also, the above-described effects may result in a decrease in power consumption of a cell searching apparatus. The configuration as above is suitable for a portable device which is operated with a limited power.

Also, a portable device according to the present invention may stably set up a link between an RAS and a terminal due to an improved cell searching performance and transmit/receive data therebetween. In particular, reestablishment of a link between the RAS and the terminal according to a change of wireless channel state and physical movement of the portable device may be more stably performed. Accordingly, the efficiency of an entire mobile communication system may be improved.

The embodiments of the present invention include computer readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc., including a carrier wave transmitting signals specifying the program instructions, data structures, etc. Examples of program instructions include both machine code, such as produced by a compiler, and files containing higher level code that may be executed by the computer using an interpreter.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus for searching for a cell in an orthogonal frequency division multiplexing (OFDM) communication system, comprising:
   a preamble sequence storage unit storing a plurality of pre-compensated preamble sequences, each of the pre-compensated preamble sequences phase rotated by a predetermined amount with respect to a preamble index; and
   a cell searching unit correlating a received time domain signal with the stored pre-compensated preamble sequences and identifying the preamble index corresponding to the received time domain signal.

2. The apparatus of claim 1, wherein the cell searching unit further determines a cell identification number and a segment number according to the preamble index.

3. The apparatus of claim 1, wherein the cell searching unit sets a size of a correlation window with respect to the received time domain signal and iteratively correlates the received signal and the pre-compensated preamble sequences over the correlation window size.

4. The apparatus of claim 3, wherein the correlation window size is determined by a certain ratio of a cyclic prefix size.

5. The apparatus of claim 4, wherein the correlation window size is 96 samples.

6. The apparatus of claim 3, wherein the cell searching unit extracts a timing index having a maximum peak, from results of the iterated correlations over the correlation window to detect a frame boundary.

7. The apparatus of claim 1, wherein the pre-compensated preamble sequences are binary quantized preamble sequences.

8. The apparatus of claim 1, wherein the pre-compensated preamble sequences are complex conjugated preamble sequences.

9. The apparatus of claim 1, wherein the predetermined amount is determined according to a segment number.

10. The apparatus of claim 1, wherein a received signal from a radio access station is pre-compensated by a predetermined phase offset to obtain the time domain signal.

11. The apparatus of claim 1, wherein a number of samples of the received time domain signal utilized for the correlation is determined based on a repeated pattern length of the received time domain signal.

12. The apparatus of claim 11, wherein the number of samples of the received time domain signal is 341 samples.

13. A portable device of an orthogonal frequency division multiplexing (OFDM) communication system, comprising:
   an initial frame boundary detector detecting a frame boundary of a received signal;
   an initial frequency offset estimator estimating a frequency offset of a frame identified by the detected frame boundary; and
   a cell searching apparatus searching for a cell by using the estimated frequency offset of the frame identified by the detected frame boundary,
   wherein the cell searching apparatus comprises:
   a preamble sequence storage unit storing a plurality of preamble sequences each of which corresponds to one preamble index; and
   a cell searching unit correlating the received signal with the stored preamble sequences in a time domain and identifying the preamble index corresponding to the received signal.

14. A method of searching for a cell in an orthogonal frequency division multiplexing (OFDM) communication system, comprising the steps of:
   receiving a time domain signal transmitted from a radio access station; and
   identifying a preamble index corresponding to the received time domain signal by correlating the received time domain signal with a plurality of pre-compensated preamble sequences, each of the pre-compensated preamble sequences phase rotated by a predetermined amount with respect to a preamble index.

15. The method of claim 14, wherein the pre-compensated preamble sequences are binary quantized preamble sequences.

16. The method of claim 14, further comprising:
   repeating cell searching with respect to a plurality of consecutively received frames, responsive to a result of cell searching not satisfy a predetermined criterion.

17. A method for searching for a cell in an orthogonal frequency division multiplexing (OFDM) communication system, comprising the steps of:
   a receiving device, detecting a frame boundary of a received signal;
   the receiving device, estimating a frequency offset of a frame identified by the detected frame boundary;
   the receiving device, sampling a preamble signal of the corresponding frame identified by the detected frame boundary; and
   the receiving device, identifying a preamble index by applying the frequency offset to the sampled preamble signal and correlating the sampled preamble signal, with a plurality of preamble sequences each of which corresponds to one preamble index in a time domain, for a correlation window based on the frame boundary.

18. A computer readable record medium storing instructions thereon, the instructions when executed by a processor in a receiving device causing the processor to:
   receive a time domain signal transmitted from a radio access station; and
   identify a preamble index corresponding to the time domain signal by correlating the time domain signal with a plurality of pre-compensated preamble sequences, each of the pre-compensated preamble sequences phase rotated by a predetermined amount with respect to a preamble index.

* * * * *